United States Patent
West et al.

(10) Patent No.: US 12,298,157 B2
(45) Date of Patent: May 13, 2025

(54) MONITORING DEVICE, MONITORING ARRANGEMENT AND MONITORING METHOD FOR MONITORING A SCREW JOINT OF AN OBJECT

(71) Applicant: Weidmüller Interface GmbH & Co. KG, Detmold (DE)

(72) Inventors: Rick West, Silverdale (AU); Christopher Lee Shih Hao Sam Soon, Singapore (SG); Gerald Busch, Lage (DE); Mathew Courtney, San Remo (AU); David Head, Cranebrook (AU); Steffen Niggemann, Paderborn (DE); Ben Scott, Singapore (SG)

(73) Assignee: Weidmüller Interface GmbH & Co. KG (DE)

( * ) Notice: Subject to any disclaimer, the term of this patent is extended or adjusted under 35 U.S.C. 154(b) by 0 days.

(21) Appl. No.: 17/929,401

(22) PCT Filed: Mar. 3, 2021

(86) PCT No.: PCT/EP2021/055313
§ 371 (c)(1),
(2) Date: Sep. 2, 2022

(87) PCT Pub. No.: WO2021/175912
PCT Pub. Date: Sep. 10, 2021

(65) Prior Publication Data
US 2023/0314184 A1    Oct. 5, 2023

(30) Foreign Application Priority Data
Mar. 5, 2020 (DE) .................... 10 2020 106 010.6

(51) Int. Cl.
*G01D 5/24*        (2006.01)
*G01D 5/241*      (2006.01)

(52) U.S. Cl.
CPC ................................ *G01D 5/2412* (2013.01)

(58) Field of Classification Search
CPC ...... G01D 5/2412; F16B 31/04; F16B 41/002
See application file for complete search history.

(56) References Cited

U.S. PATENT DOCUMENTS 4,924,407 A    5/1990 King et al.
4,996,492 A *  2/1991 Anderson .............. G01B 7/282
                                                    324/687

(Continued)

FOREIGN PATENT DOCUMENTS

DE         19816810 A1    10/1999

*Primary Examiner* — Alvaro E Fortich
(74) *Attorney, Agent, or Firm* — LAUBSCHER & FRETWELL, P.C.

(57) ABSTRACT

A monitoring device for monitoring a screw joint of an object includes a base plate to be attached to the object and a top plate to be attached to one part of the screw joint, wherein the base plate and the top plate are positioned parallel to and on top of each other and wherein both plates each includes at least one electrode that capacitively interact with each other. The monitoring device is characterized in that the electrodes are shaped and positioned such that at least one electrode of one of the plates interacts with at least two different electrodes of the other one of the plates depending on the rotational position of the plates relative to each other. A monitoring arrangement having at least one monitoring device of this kind and a monitoring method are also provided.

21 Claims, 10 Drawing Sheets

(56) References Cited

U.S. PATENT DOCUMENTS

| | | |
|---|---|---|
| 6,449,853 B1 | 9/2002 | Brueggemann |
| 8,872,668 B2 | 10/2014 | Schnare |
| 2008/0129311 A1 | 6/2008 | Schuster et al. |
| 2013/0049952 A1* | 2/2013 | Schnare ................ G01B 7/003 |
| | | 324/693 |
| 2015/0028893 A1 | 1/2015 | Schnare |
| 2016/0054385 A1* | 2/2016 | Suto ................... G01R 31/2812 |
| | | 324/754.1 |
| 2017/0022978 A1 | 1/2017 | Li |

\* cited by examiner

MONITORING DEVICE, MONITORING ARRANGEMENT AND MONITORING METHOD FOR MONITORING A SCREW JOINT OF AN OBJECT

BACKGROUND OF THE INVENTION

The invention relates to a monitoring device for monitoring a screw joint of an object, the monitoring device comprising a base plate to be attached to the object and a top plate to be attached to one part of the screw joint, wherein the base plate and the top plate are positioned parallel to and on top of each other and wherein the base plate and the top plate each comprises at least one electrode that capacitively interact with each other. The invention further relates to a monitoring arrangement having at least one monitoring device and to a monitoring method.

BRIEF DESCRIPTION OF THE PRIOR ART

Many cases exist in which screw joints of an object are essential for a correct operation of the object. Furthermore, security aspects are related to the correct position of all parts of the screw joint.

Smaller screw joints are often mechanically secured in order to ensure a tight fit of the screw joint. Known mechanical means are the use of counter-nuts, locking adhesives or cotter-pins, e.g. split-pins.

Large screw joints in security critical applications are alternatively or additionally monitored by a monitoring device as described above.

As an application example but not limited to, a rotor wind turbine often comprises a flange that is fixed to an axis of a gearbox or generator by a plurality of large size screw joints. The screws are tightened to a predetermined torque and at least a selection of the screw joints is equipped with a monitoring device that detects a loosening of the screw joint, for example loosing of a nut of the screw joint compared to the flange.

A monitoring device as mentioned at the outset is for example known from U.S. Pat. No. 8,872,668 B2. The base plate and the top plate are each fixed to observed components. In one embodiment, a resistance between contacting electrodes of the base plate and the top plate is determined. Loosening of the nut relative to the flange leads to a break of contact that is observed and that leads to an alarm being generated. As an alternative to determining a resistance, the document mentions the observation of a capacitive change between two interacting electrodes of base plate and top plate, respectively. According to the document U.S. Pat. No. 8,872,668 B2, detection sensitivity can be enlarged by determining continuous changes in the measured electrical property, wherein an alarm is issued when a certain threshold of the continuously measured property is over- or underrun. Sensitivity of the system depends on the threshold value, however, it appears that a compromise between gaining a good detection sensitivity versus minimizing the danger to produce false alarms has to be found. Accordingly, gaining a higher sensitivity increases the vulnerability to false alarms.

It is therefore an object of the present invention to provide a monitoring device and a monitoring arrangement as described in the outset that has a high sensitivity to detect even small rotational movements of a screw joint while operating failure-free.

SUMMARY OF THE INVENTION

A monitoring device according to the invention is characterized in that the electrodes are shaped and positioned such that at least one electrode of one of the plates interacts with at least two different electrodes of the other one of the plates depending on the rotational position of the plates relative to each other.

This arrangement allows to determine the angular position from a comparison of two capacitance measurements. If a single capacitance value is measured, where the value of this capacitance changes with rotational angle of the two plates (for example if the overlapping area of the two electrodes changes with the rotational angle) according to prior art, then the rotational position can only be determined from an absolute capacitance value. According to the present invention, the values of the capacitance between the (common) electrode on the one plate and each of the at least two electrodes on the other plate are compared with each other. The angular position of the two plates relative to each other is then e.g. indicated by the electrode combination showing the highest capacitance value.

Accordingly, an inventive method for monitoring a screw joint of an object is characterized in that such a monitoring device is used. In one embodiment of the method, at least two capacitance values are measured between the at least one electrode of the one plate and each of the at least two interacting electrodes of the other one of the plates. The rotational position of the plates relative to each other by comparing the at least two capacitance values with each other, e.g. by finding a maximum of at least two capacitance values.

This results in a robust and stable monitoring process that is less prone to disturbances.

In an advantageous embodiment of the method the step of comparing the at least two capacitance values with each other comprises the steps of determining an interpolation function that describes the at least two capacitance values as a function of a geometric position of the related electrodes and finding a maximum of the interpolation function. While the above method based on the maximum of the measured values themselves will achieve an angular resolution that is equal to the angular separation of the at least two electrodes, it is possible to further extend the above mentioned method so as to achieve a higher level of resolution by determining the maximum of the interpolation function.

In an advantageous embodiment of the monitoring device both plates are ring shaped with the electrodes disposed on one side or at least close to one side of each plate. Preferably the electrodes form segments that each extend over a certain angular range of the respective plate. In order to achieve smoothly varying results that can be well interpolated, it is advantageous to have the at least two electrodes each extending over an angular range that is smaller than the angular range that the at least one electrode covers. The angular range is preferably smaller by a factor between 1.3 and 1.7 and in particular by a factor of approximately 1.5. The angular range that the at least one electrode covers could e.g. be approx. 4° to 5°, preferably approx. 4.5°. The angular range that the at least two electrodes each cover could be approx. 2.5° to 3.5°, preferably approx. 3°. This provides a reasonable angular resolution while leading to capacitance values that can still be measured with high precision and a good signal-to-noise ratio.

In a further advantageous embodiment of the monitoring device the at least two electrodes are part of an electrode arrangement that comprises a plurality of electrodes arranged side by side. By providing a plurality of electrodes, a wider angular measurement range can be achieved while still have a high angular resolution. Preferably the number of electrodes of the plurality of electrodes is equal to a power of two, e.g. 8 or 16. In order to decrease complexity and costs of the measurement circuit, a multiplexer arrangement can be used for the capacitance measurement. Only one circuit to measure capacitance is then needed. The multiplexer arrangement connects this circuit subsequently to the different electrode combinations. The selection of the electrode pairing that is measured is usually done by a digital coding and commercially available multiplexers thus have a number of channels equal to a power of two. It is accordingly advantageous to also select the number of electrodes to be equal to a power of two.

In a further advantageous embodiment of the monitoring device both plates are at least partially made of a printed circuit board, with the electrodes provided by a conductive layer of the printed circuit board. This way, electrodes can be easily provided and contacted also in larger numbers. The conductive layer can be a buried layer of the printed circuit board in order to avoid direct contact of the electrodes of the two plates with each other.

In a further advantageous embodiment of the monitoring device each of the two plates comprises a further electrode that interact with each other and form a capacitor which is connected in series with the capacitor established between the electrodes. The capacitor formed by the two further electrodes can be used to transfer a measurement signal from one of the plates to the other. Only one of the plates then needs to be contacted with wires to perform the capacitance measurements. To contact the electrodes, at least one of the two plates can further comprise a terminal.

In a further advantageous embodiment, the monitoring device comprises a measurement circuit for evaluating at least two capacity values established between two different pairs of electrodes. The measurement circuit can comprise a wireless transmitter for transmitting results of the evaluation of the at least two capacity values. Integrating the measurement circuit into the monitoring device leads to short wires between the measurement circuit and the electrodes which improves the signal quality and reduces disturbing noise. By further integrating the wireless transmitter a self-sustaining monitoring device is created.

A monitoring arrangement for monitoring screw joints of an object according to the invention comprises at least one monitoring device with an integrated measurement circuit and an integrated wireless transmitter and furthermore comprises a wireless receiver. Preferably a plurality of according monitoring devices is connected to the wireless receiver. More than one screw joints, e.g. all screw joints used to mechanically connect two flanges, can then be monitored by just one receiver.

BRIEF DESCRIPTION OF THE FIGURES

The invention will be explained in more detail in the following with reference to figures showing different embodiments. The figures show.

DETAILED DESCRIPTION

Identical reference numbers denote identical or equivalent features in all figures. For the sake of clarity, not all visible features are supplied with reference numbers in all figures.

Figure 1:
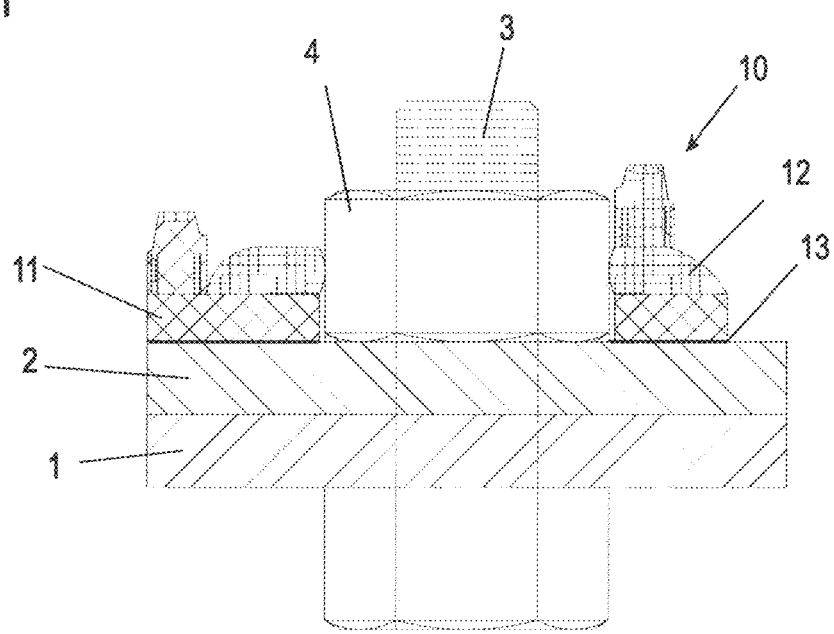
FIG. 1 a side view of a screw joint with a monitoring device.
Figure 2:
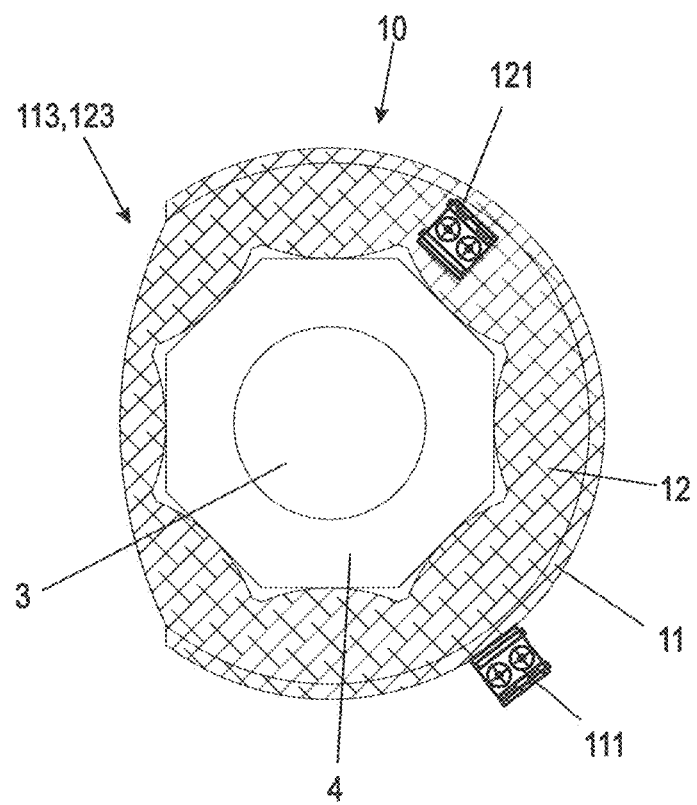
FIG. 2 a top view on the arrangement of FIG. 1.

FIGS. 1 and 2 show a first embodiment of a monitoring device 10. FIG. 1 shows a sectional view and FIG. 2 a top view.

The system which is observed in the first embodiment comprises by way of example two flanges 1, 2 fixed together by a screw joint comprising a bolt 3 and a nut 4. The bolt 3 is guided through a drill hole in the flanges 1, 2 with a bolt head on one side and the nut 4 on the other side.

The monitoring device 10 comprises two main parts, a base plate 11 and a top plate 12. Both plates 11, 12 have a shape similar to a circular ring and both plates 11, 12 are arranged parallel to each other and on top of each other on one side of the flanges 1, 2—in the case shown on flange 2.

The base plate 11 has a circular cut out in its center with which its surrounds the nut 4 such that the nut 4 could freely turn around within the cut out. The base plate 11 is fixed to the flange for example by using an adhesive layer 13.

The top plate 12 also has a cut out that surrounds the nut 3, however the cut out in the top plate 12 is a polygon cut out 124 that resembles the outer circumference of the nut 3, in this case an octagonal shape. The top plate 12 thus would rotate with the nut 4 if the nut 4 becomes loose and turns relative to the flange 2, while the base plate 11 would keep its orientation relative to the flange 2. Accordingly, top plate 12 and base plate 11 will rotate relative to each other if the nut 4 becomes loose and turns around relative to the bolt 3 and the flange 2. To keep the top plate 12 on top of the base plate 11, a holding means can be attached to the nut 3, for example clipped onto the nut 4 and kept in place by frictional force. Alternatively, the top plate 12 could also be kept in place by a magnetic force or be an adhesive.

The base plate 11 can thus also be regarded as a fixed plate and the top plate 12 can also be regarded as a moving plate.

Base plate 11 and top plate 12 are equipped with electrodes 112, 122 that face each other and that interact with each other. The electrodes 112 of the base plate are accessible by a terminal 111 attached to the base plate 11. The electrodes 122 of the top plate 12 are connected to and are accessible by a terminal 121 attached to the top plate 12.

The space around the nut 4 might be tight. For this reason, the base plate 11 and the top plate 12 do not have full circular circumferences. At least one side of the base plate 11 and the top plate 12 is trimmed by an edge trimming 113, 123, respectively. In case of the flanges 1, 2 being part of a rotor mount of a wind turbine, space next to the nuts 4 could for example be limited due to the gear box axis, which is surrounded by a plurality of nuts 4 and bolts 3 in the flanges 1, 2.

Figure 3:
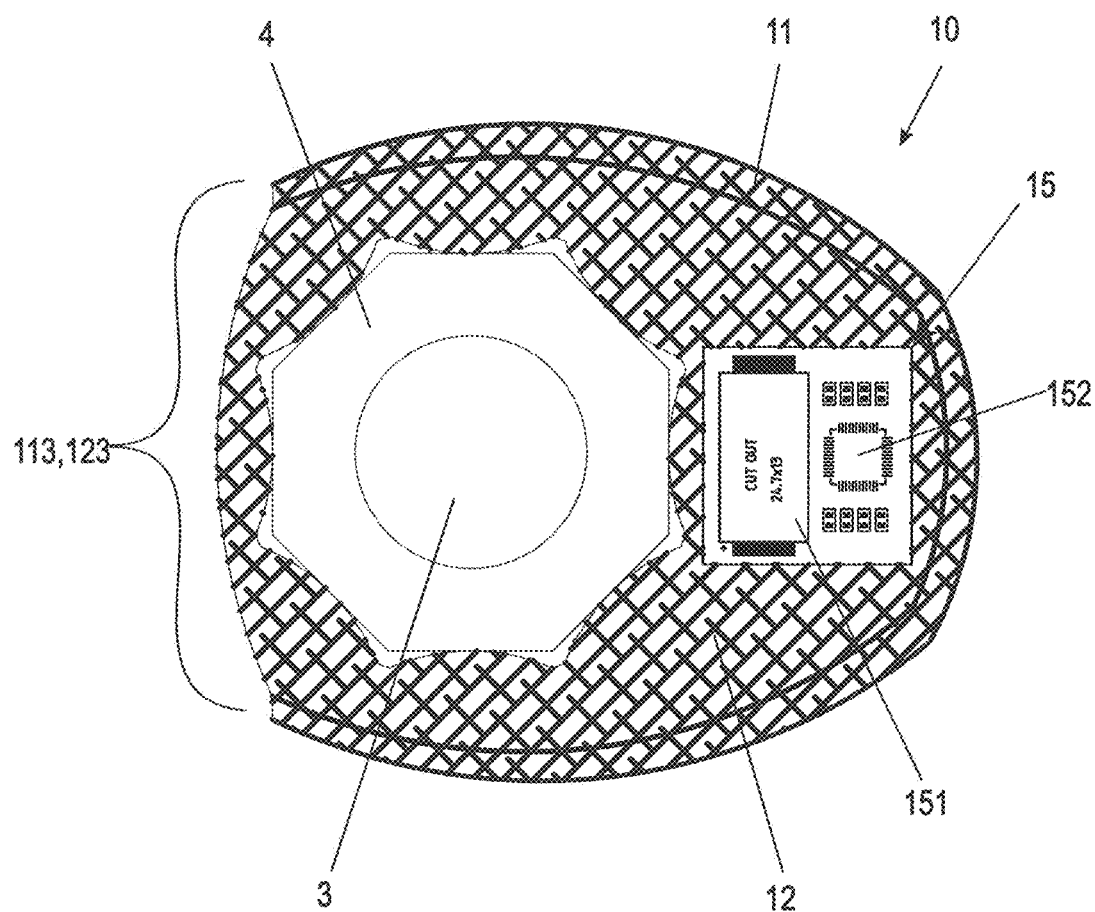
FIG. 3 a top view of a further embodiment monitoring device mounted to a screw joint.

FIG. 3 shows a second embodiment of the monitoring device 10 in a top view comparable to FIG. 2. The basic arrangement is comparable to that one of the first embodiment. However, the basic shape (apart from the edge trimming 113, 123) is not circular as in the first embodiment but elongated in one direction, concretely on the side of the nut 4 that is opposite of the edge trimming 113, 123. The additional space gained on the top plate 12 is used to accommodate a measurement circuit 15 for analyzing signals from the electrodes 112, 122 and for transmitting results of the analysis to a wireless receiver not shown in FIG. 3. The measurement circuit 15 comprises a battery 151 and a wireless transmitter 152.

Since signals of the electrodes are analyzed by the integrated measurement circuit 15, the terminals 111, 121 visible in the first embodiment are omitted in this second embodiment. FIG. 3 thus shows a self-sustaining monitoring device that can be easily mounted to a screw joint and does not require any further wiring. By using low-energy wireless transmission, for example according to the Bluetooth LE (low energy) or the LoRa standard, lifetime of the battery 151 will be long enough, for example more than one year, so that a battery change can be performed within usual maintenance intervals. In a further development of the embodiment shown in FIG. 3, the measurement circuit 15 can be equipped with energy harvesting means that generates energy used to operate the measurement circuit 15. Energy can e.g. be gained from rotation of the flanges 1, 2 and thus the monitoring device 10. The battery 151 is preferably a rechargeable battery used to back-up the energy harvesting means.

Figure 4A:
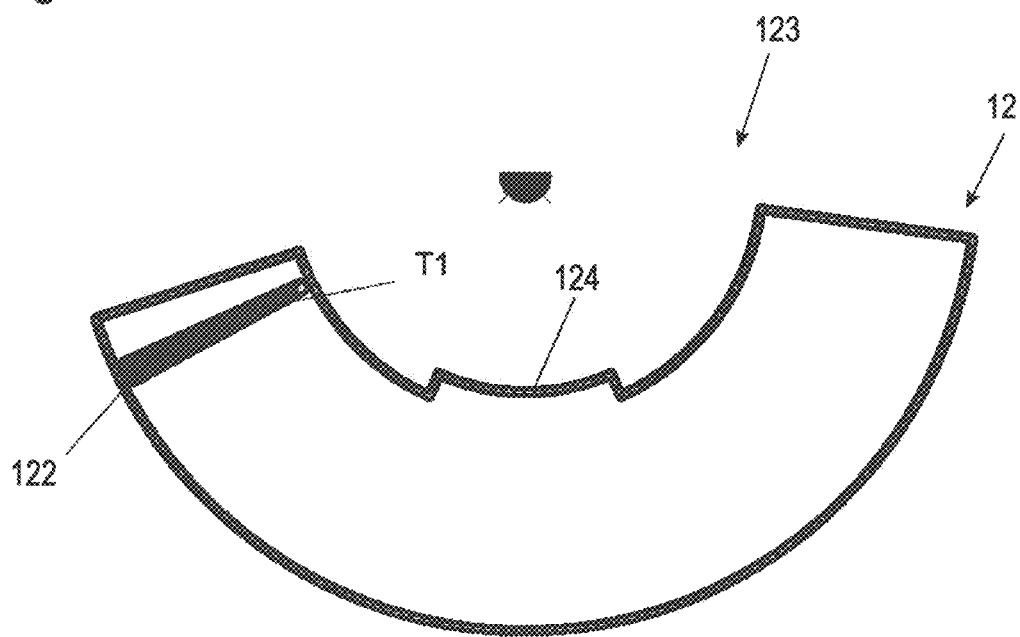
FIG. 4a, b a top view of a top plate (FIG. 4a) and a base plate (FIG. 4b) of an embodiment of a monitoring device.
Figure 4C:
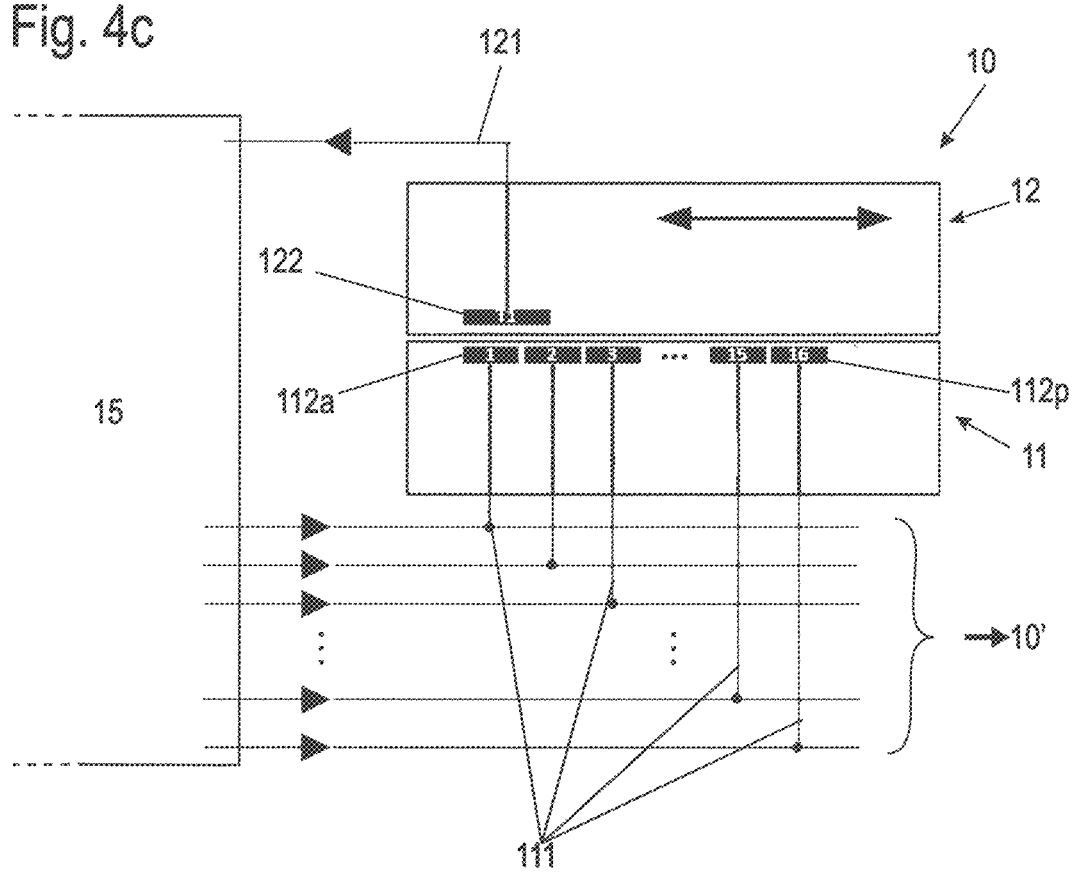
FIG. 4c a monitoring arrangement comprising the monitoring device according to FIGS. 4a, b.
Figure 4B:
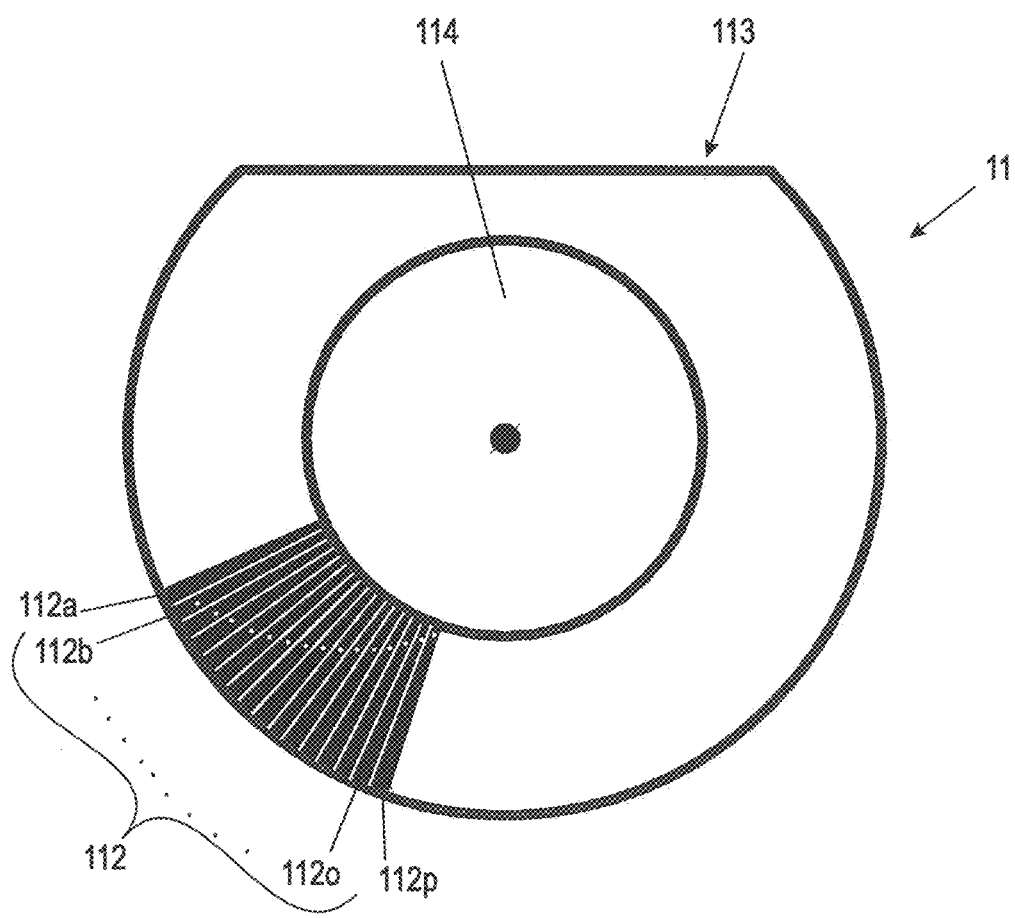

FIGS. 4a-4c depict an embodiment of a monitoring device 10 and a monitoring arrangement comprising the monitoring device 10 in more detail. The monitoring devices 10 shown in FIGS. 1 and 2 can for example be built accordingly. FIG. 4a shows a top view of a part of a top plate 12 of the monitoring device 10 and FIG. 4b shows a top view of the base plate 11 of the monitoring device 10. FIG. 4c shows a schematic sectional view through the two plates 11, 12 and in particularly shows the wiring between the monitoring device 10 and a measurement circuit 15.

FIG. 4a only shows a part of the top plate 12 that carries an electrode 122. This part is shaped in the form of a section of a circular ring. It might be embedded into a further part of the top plate such that the entire top plate is a complete circular ring. Further, the polygon cut-out 124 that is used to rotationally fix top plate 12 to a part of the screw joint, e.g. the nut 4 (compare FIGS. 1-3) is in form of a protrusion in this embodiment. However, it fulfills the same purpose as in the afore mentioned embodiments, namely that the top plate 12 rotates with the monitored part of the screw joint.

There is one electrode 122 provided at the surface of the top plate 12 or at least in close proximity of the surface. The electrode 122 is formed in the shape of a segment of the circular ring with the edges pointing towards the center of the ring. In the example shown, the segment covers approximately 4.5° angular length.

The part of the top plate 12 that carries the electrode 122 can preferably be a printed circuit board (PCB), where the electrode 122 is a copper layer of the PCB. The electrode 122 is either covered by an insulating layer or is a so-called buried copper layer of the PCB. The connection from the electrode 122 to a terminal (compare terminal 111 in FIGS. 1-3) that is not shown here is preferably established by the same copper layer of the PCB that forms the electrode 122.

FIG. 4b shows the corresponding base plate 11. According to the invention, the base plate 11 does not comprise a single electrode but an electrode arrangement 112 that consists of a plurality of individual electrodes 112a, 112b to 112o and 112p. Each electrode 112a-112p is shaped as a segment of a circle ring, i.e. a similar to the electrode 122 of the top plate 12, but with a smaller angular length of approximately 3° in this example. All electrodes 112a-112p are arranged side by side with a small insulating gap between them. The whole electrode arrangement 112 accordingly covers approximately an angular range of 45°.

The base plate 11 is again preferably made of a PCB. Concerning details of the forming of the electrode arrangement 112 and/or the connection to a terminal 111 or to an integrated measurement circuit 15 (similar to the embodiment of FIG. 3) it is referred to above explanations related to the top plate 12.

FIG. 4c schematically shows the connection of the electrode 122 and the electrode arrangement 112 with an integrated measurement circuit 15. Each electrode 112a-112p is individually coupled to the measurement circuit 15. The measurement circuit 15 is designed to measure a capacity between the common electrode 122 and each individual electrode 112a-112p. This measurement method leads to an enhanced position sensitivity that is mainly given by the geometric extension (the angular arrangement) of the electrodes 122 and 112a-112p. Furthermore, a very robust position detection is achieved. The reason is that determining the position does not depend on an absolute capacitance measurement and small changes observed in the measured value, but rather on a comparison of relative measurements.

As indicated, the wires that connect the electrodes 112a-112p with the measurement circuit 15 might lead to a further monitoring device 10. That way only one of the monitoring devices 10 needs to be equipped with a measurement circuit 15 for analyzing the capacitance values of the electrodes of the (coupled) monitoring devices 10. The connected monitoring devices 10 are in this sense passive monitoring devices without any circuits for analyzing capacitance values.

If a single capacitance value is measured, where the value of this capacitance changes with rotational angle of the two plates (for example if the overlapping area of the two electrodes changes with the rotational angle), then the rotational position can only be determined from an absolute capacitance value. According to the present invention, the values of the capacitance between the common electrode 122 and each of the individual electrodes 112a-112p are compared with each other and the electrode combination showing the highest capacity clearly denotes the angular position of the two plates relative to each other.

In order to decrease complexity and costs of the measurement circuit 15, a multiplexer arrangement can be used for the capacitance measurement. Accordingly, only one circuit to measure capacitance is needed. The multiplexer arrangement then connects this circuit subsequently to the different electrode combinations. Measuring the capacitance can be performed by known techniques, for example by switching the capacitance to be measured into an oscillating circuit and measuring the frequency of the oscillator.

Figure 5A:
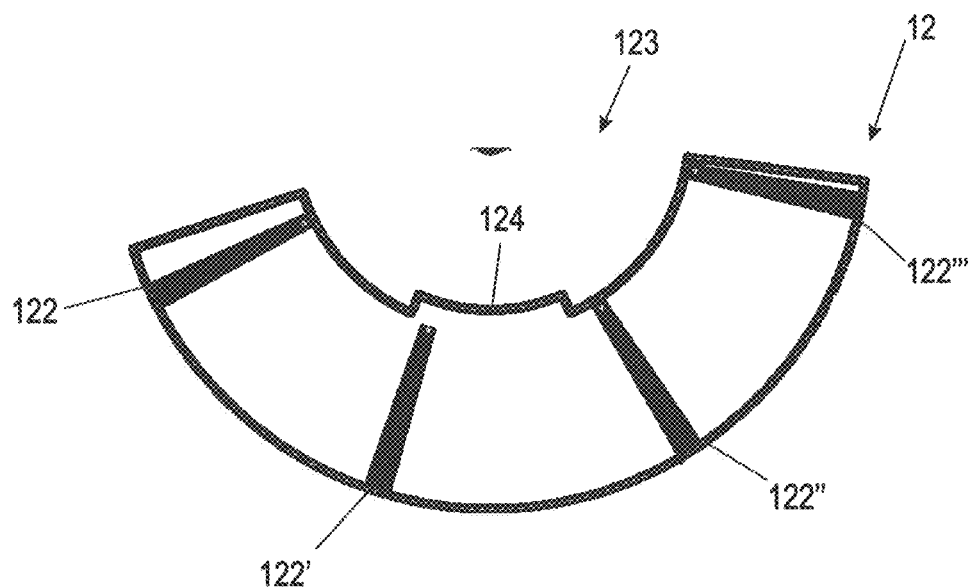
FIG. 5a, b a top view of a top plate (FIG. 5a) and a base plate (FIG. 5b) of a further embodiment of a monitoring device.
Figure 5C:
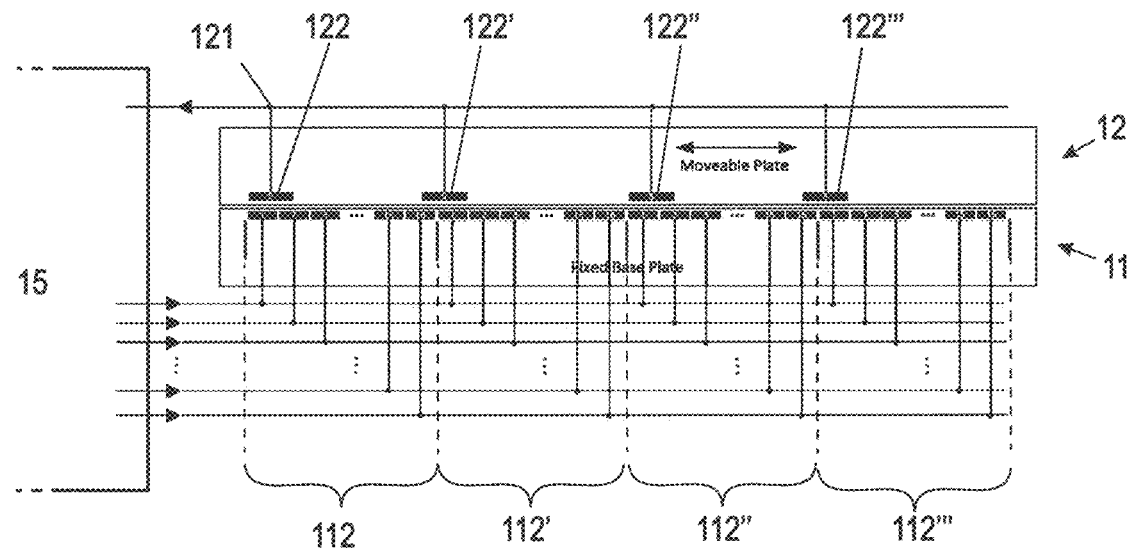
FIG. 5c a monitoring arrangement comprising the monitoring device according to FIGS. 5a, b.
Figure 5B:
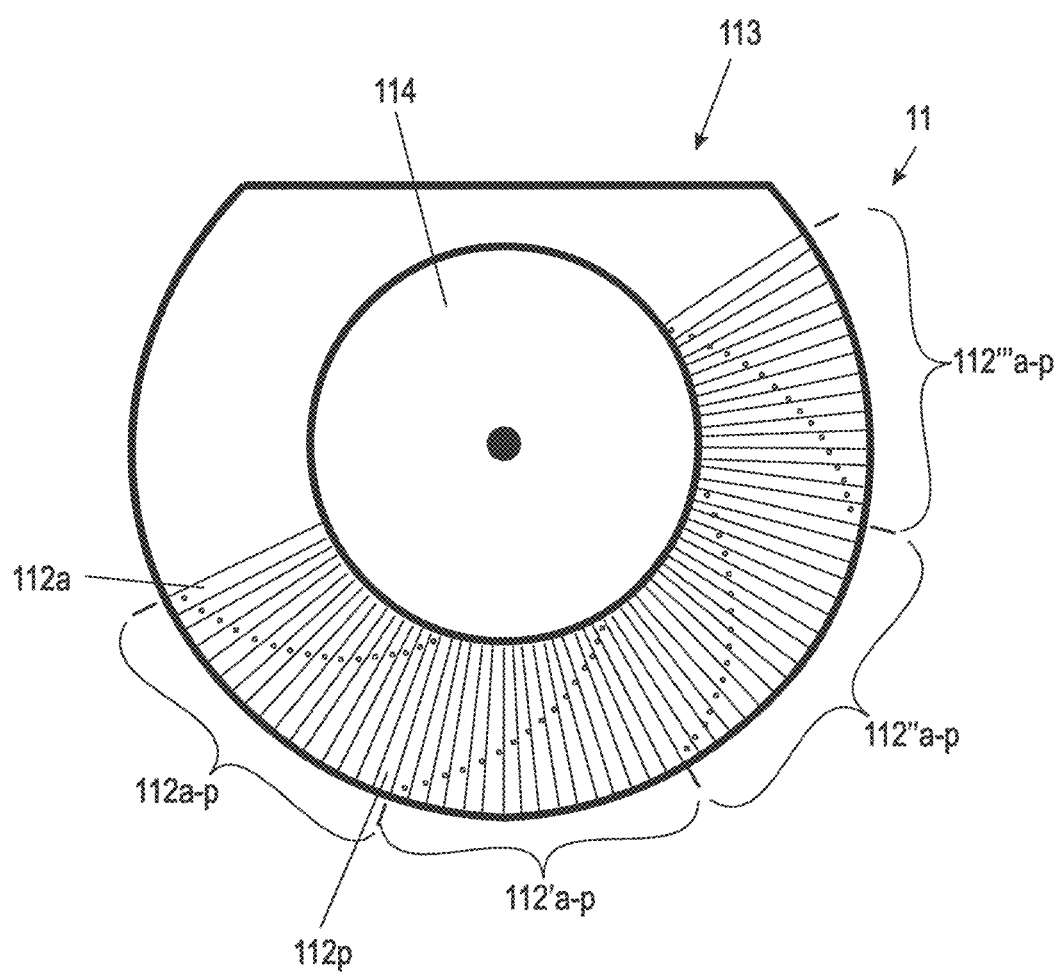

FIGS. 5a-c show further embodiment of a monitoring device 10 in analogous manner as FIGS. 4a-c.

The design is basically the same as the design of the embodiments shown in FIGS. 4a-c, which are explicitly referenced in this respect.

As apparent from FIG. 5a, the top plate 12 has an electrode 122 having the same size, shape and position as in the embodiment shown in FIG. 4a. Also, as visible in FIG. 5b, the base plate 11 has the same electrode arrangement 112 as the embodiment shown in FIG. 4b. In addition to the interacting electrodes 122 and 112a-112p of the electrode arrangement 112, three further sets of electrodes 122', 122", 122''' are present on the top plate 12 and according electrode arrangements 112', 112", 112''' are present on the base plate 11.

As can be seen in FIG. 5c, the electrodes 122', 122", 112''' are electrically connected in parallel. Also, corresponding electrodes of the electrode arrangements 112', 112", 112''' are connected in parallel. Accordingly, even with small individual electrodes 122, 112a-112p, the analyzed capacitance values are larger by a factor given by the number of sets. This leads to an even more robust position detection.

It is noted that the number of sets—four in the present case—is purely exemplarily. The number of sets can be smaller or larger, depending on the available space and also depending on the angular range to observe.

Figure 6A:
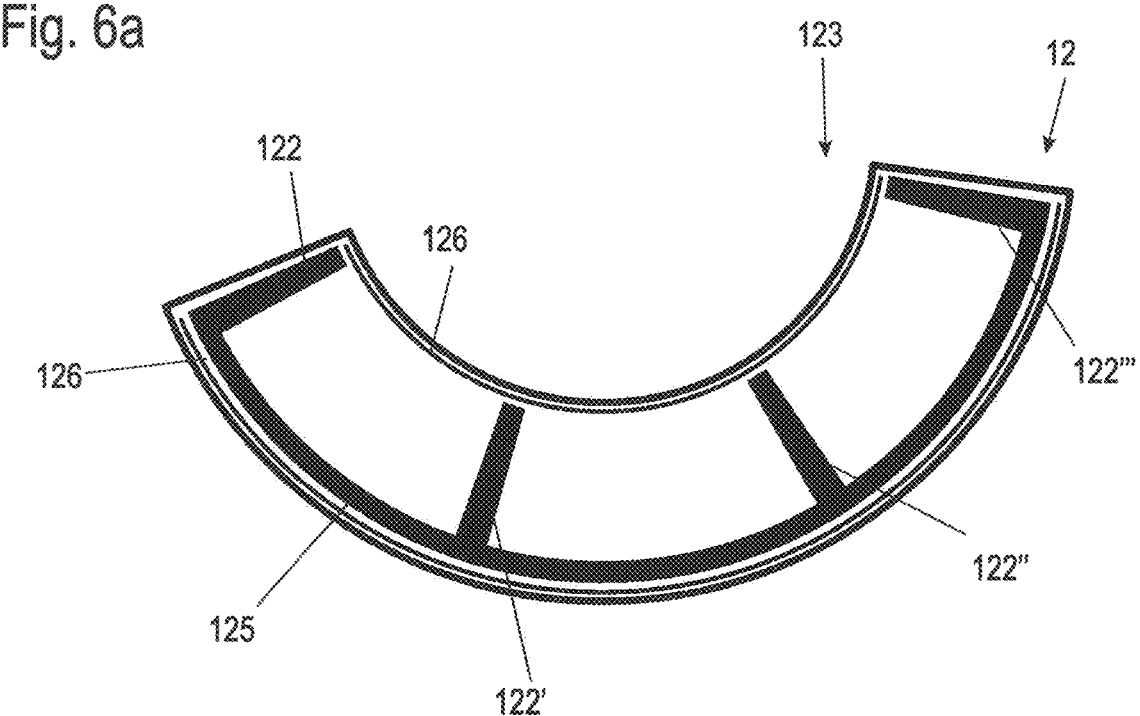
FIG. 6a, b a top view of a top plate (FIG. 6a) and a base plate (FIG. 6b) of a further embodiment of a monitoring device.
Figure 6C:
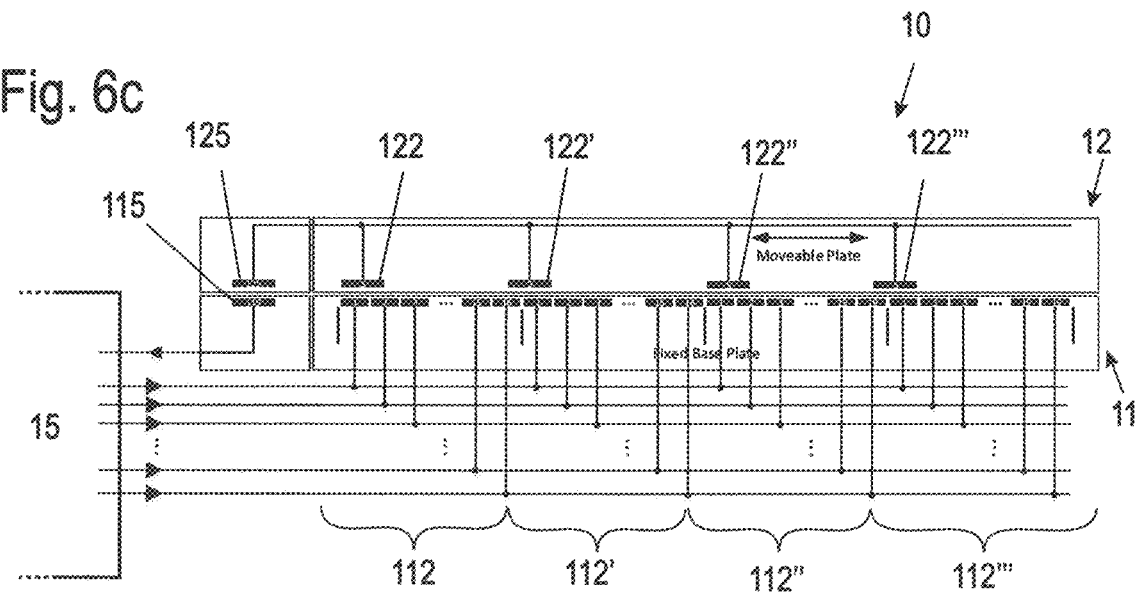
FIG. 6c a monitoring arrangement comprising the monitoring device according to FIGS. 6a, b.
Figure 6B:
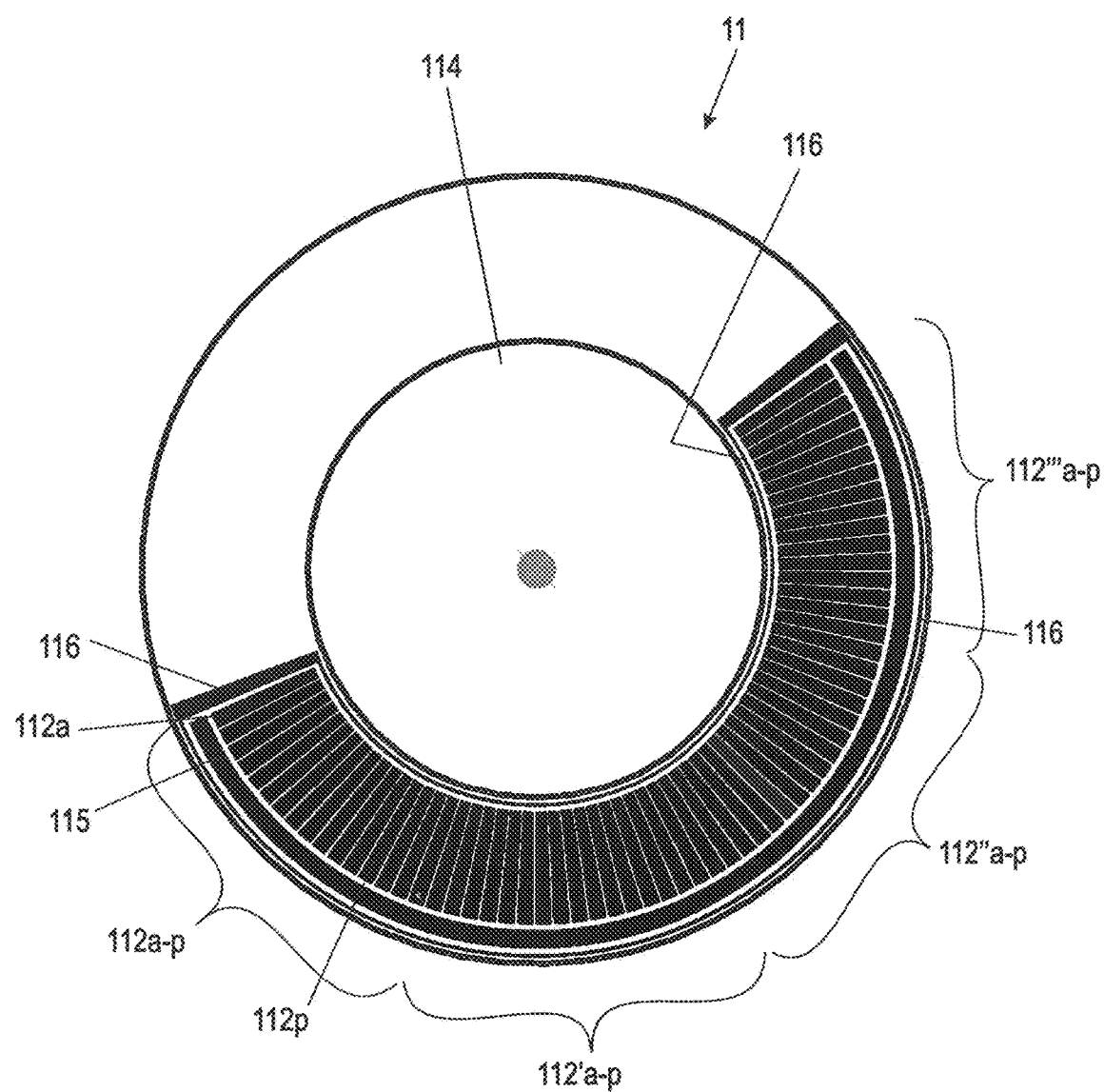

FIGS. 6a-c show another embodiment of a monitoring device 10 in analogous manner as FIGS. 4a-c and 5a-c.

Again, the design is basically the same as the designs of the embodiments shown in FIGS. 4a-c and 5a-c, which are therefore explicitly referenced in this respect. As in the example of FIGS. 5a-c, four sets of cooperating electrodes are present, i.e. the top plate 12 has four electrodes 122, 122', 122", 122''' and the bottom plate 11 (see FIG. 6b) has four sets of electrode arrangements 112, 112', 112", 112'''.

As can be seen in FIG. 6a, the four electrodes 122, 122', 122" and 122''' are connected to each other on the top plate itself. The connection is done via a further electrode 125, which is formed like a ring (or more precisely a segment of a ring) positioned close to the outer circumference of the top plate 12.

This further electrode 125 does not only connect the four electrodes 122, 122', 122" and 122''', but also cooperates with a similarly shaped and positioned further electrode 115 on the bottom plate 11. The two further electrodes 115, 125 form a capacitor between the base plate 11 and the top plate 12. This capacitor has a constant capacitance independent of the rotational position of the two plates 11, 12 relative to each other. The capacitor is used to transmit the signal of the top plate 12 that is present at a terminal 121 in the afore mentioned embodiments to the bottom plate 11 and from there—via connection—to the measurement circuit 15.

The resulting signal routing is visible in FIG. 6c. This setup has the advantage that there is no direct wire connection between the moveable top plate 12 and the measurement circuit 15. All connections between the measurement circuit and electrodes are arranged on the base plate 11. Wiring can thus be simplified, in particular if the measurement circuit 15 is arranged on the base plate 11 itself.

FIGS. 6a-c show another advantageous feature. This feature is optional and independent of the capacitive coupling between the further electrodes 115, 125. It could also be implemented into the afore mentioned embodiments. According to this further optional feature, two shielding electrodes 116, 126 are present on the base plate 11 and the top plate 12. The shielding electrodes 116, 126 surround the electrodes and shield the arrangement against external electromagnetic disturbances.

Figure 7:
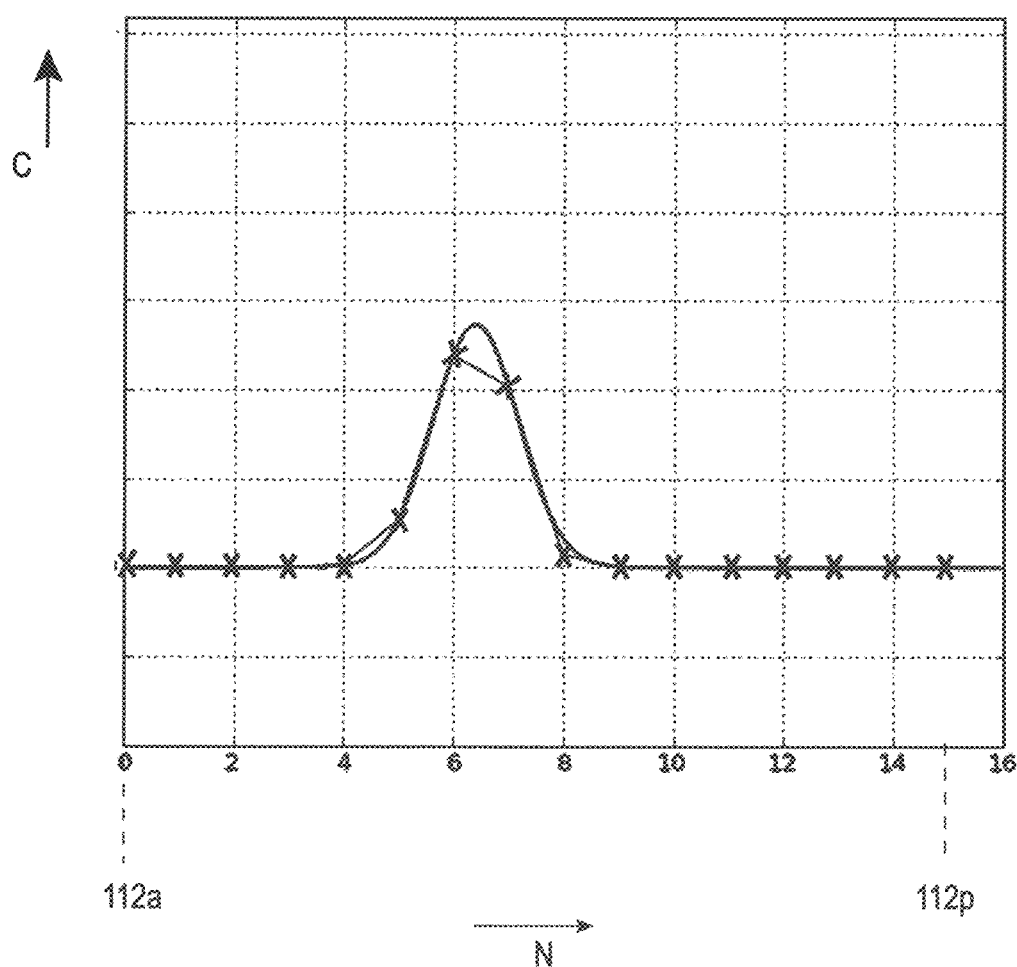
FIG. 7 a diagram showing capacitance measurement results.

FIG. 7 shows results of capacitance measurements performed by a measurement circuit, e.g. the measurement circuit 15 shown in FIG. 4a, 5a or 6c, in a diagram. A value of the measured capacitance C is denoted on the vertical axis. The horizontal axis shows a number N ranging from 0 to 15, wherein each electrode 112a-112p is assigned a number, starting from N=0 for electrode 112a to N=15 for electrode 112p.

The measured capacitance values for all electrodes 112a-p (or, more precisely, for all pairs of one of the electrodes 112a-p with electrode 122) are represented as crosses in the diagram of FIG. 7.

In a first embodiment of a method for determining a rotational position of a top plate 12 relative to a base plate 11 of a monitoring device 10, capacitance values C are measured and the value with the highest capacitance value C is selected. In the example shown, N=6 (i.e. electrode 112g) shows the highest value. It is then assumed that the rotational position of the top plate 12 is such that its electrode 122 is positioned opposite of this electrode 112g. Using this method, an angular resolution that is equal to the angular separation of the electrodes 112a-p is achieved.

In an alternative embodiment it is possible to further extend the above-mentioned method so as to achieve a higher level of resolution. Starting with the same measurement, this method involves interpolating the capacitance values C for at least the electrodes 112a-p that are in the vicinity of the peak onto an interpolating function.

Such a function could be a polynomial, e.g. quadratic, or a gaussian function. A line shows an interpolating gaussian function in the example of FIG. 7. Several algorithms can be used to carry out such an interpolating function, sometimes also called a fitting function. As an example, Lagrange Polynomials could be used for polynomial fitting. By finding a local maximum of the interpolated function, it is then be possible to derive the angular position of the moveable plate to a finer level of resolution, even if the moveable plate is in between two electrodes. In the example shown, the local maximum is located at about approximately N=6.4 to 6.5.

Figure 8:
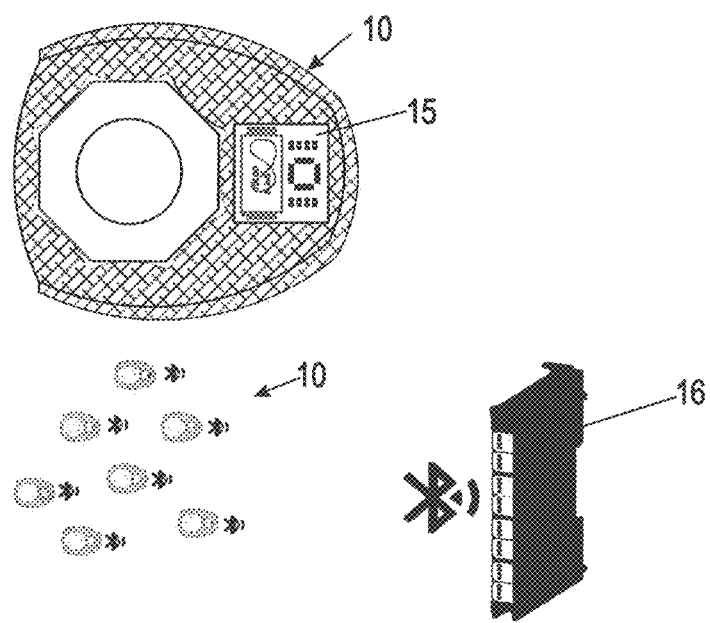
FIG. 8 a schematic drawing of a monitoring arrangement comprising a plurality of monitoring devices in a further embodiment.

FIG. 8 shows an embodiment of a monitoring arrangement in which a plurality of monitoring devices 10 is present. Each monitoring device 10 comprises a measurement circuit 15 with a wireless transmitter which is individually coupled to a wireless receiver 16 in this case. By way of example, eight screw joint and accordingly eight monitoring devices 10 are used in this embodiment.

The invention claimed is:

1. A monitoring device for monitoring a screw joint of an object, comprising a base plate to be attached to the object and a top plate to be attached to one part of the screw joint, wherein the base plate and the top plate are positioned parallel to and on top of each other and wherein both plates each comprise at least one electrode that capacitively interacts with each other, characterized in that the electrodes are shaped and positioned such that at least one electrode of one of the plates interacts with at least two different electrodes of the other one of the plates to measure two capacitance values between the at least one plate and each of the at least two interacting electrodes of the other one of the plates, respectively, depending on the rotational position of the plates relative to each other.

2. The monitoring device according to claim 1, wherein both plates are ring shaped with the electrodes disposed on one side or at least close to one side of each plate.

3. The monitoring device according to claim 2, wherein the electrodes form segments that each extend over a certain angular range of the respective plate.

4. The monitoring device according to claim 3, wherein the at least two electrodes each extend over an angular range that is smaller than the angular range that the at least one electrode covers.

5. The monitoring device according to claim 4, wherein the angular range is smaller by a factor between 1.3 and 1.7.

6. The monitoring device according to claim 5, wherein the at least one electrode covers an angular range of 4° to 5° and each of the at least two electrodes cover an angular range of 2.5° to 3.5°.

7. The monitoring device according to claim 1, wherein the at least two electrodes are part of an electrode arrangement that comprises a plurality of electrodes arranged side by side.

8. The monitoring device according to claim 7, wherein the number of electrodes of the plurality of electrodes is equal to a power of two.

9. The monitoring device according to claim 8, wherein the number of electrodes is equal to 8 or 16.

10. The monitoring device according to claim 1, wherein both plates are printed circuit boards, with the electrodes—provided by a conductive layer of the respective printed circuit board.

11. The monitoring device according to claim 10, wherein the conductive layer is a buried layer of the printed circuit board.

12. The monitoring device according to claim 1, wherein each of the two plates comprises a further electrode, the further electrodes interacting with each other and thereby forming a capacitor which is connected in series with the capacitor established between the electrodes.

13. The monitoring device according to 1, wherein at least one of the two plates comprises a terminal for contacting the electrodes.

14. The monitoring device according to claim 1, comprising a measurement circuit for evaluating at least two capacity values established between two different pairs of electrodes.

15. The monitoring device according claim 14, wherein the measurement circuit comprises a wireless transmitter for transmitting results of the evaluation of the at least two capacity values.

16. A monitoring arrangement for monitoring screw joints of an object, the arrangement comprising at least one monitoring device according to claim 14 and a wireless receiver.

17. The monitoring arrangement according to claim 16, comprising a plurality of monitoring devices, each connecting the wireless receiver.

18. A method for monitoring a screw joint of an object, comprising the step of using the monitoring device according to claim 1.

19. The method according to claim 18, and further comprising the step of comparing the at least two capacitance values with each other to determine the rotational position of the plates relative to each other.

20. The method according to claim 19, wherein the step of comparing the at least two capacitance values with each other comprises a step of finding a maximum of at least two capacitance values.

21. The method according to claim 19, wherein the step of comparing the at least two capacitance values with each other comprises the steps of determining an interpolation function that describes the at least two capacitance values as a function of a geometric position of the related electrodes and finding a maximum of the interpolation function.

\* \* \* \* \*